(12) United States Patent
Song

(10) Patent No.: US 8,393,754 B2
(45) Date of Patent: Mar. 12, 2013

(54) LASER NAVIGATION MODULE

(75) Inventor: Seung Yeol Song, Gyunggi-do (KR)

(73) Assignee: Samsung Electro-Mechanics Co., Ltd, Gyunggi-do (KR)

( * ) Notice: Subject to any disclaimer, the term of this patent is extended or adjusted under 35 U.S.C. 154(b) by 199 days.

(21) Appl. No.: 13/033,071

(22) Filed: Feb. 23, 2011

(65) Prior Publication Data

US 2012/0162981 A1   Jun. 28, 2012

(30) Foreign Application Priority Data

Dec. 24, 2010  (KR) ........................ 10-2010-0134691

(51) Int. Cl.
 *F21V 1/00*  (2006.01)
(52) U.S. Cl. ....................................... 362/235; 345/166
(58) Field of Classification Search ................ 362/235; 345/157, 166, 175
See application file for complete search history.

*Primary Examiner* — Mariceli Santiago
*Assistant Examiner* — Donald Raleigh
(74) *Attorney, Agent, or Firm* — Ladas & Parry, LLP

(57) ABSTRACT

Disclosed herein is a laser navigation module, including: a light source radiating laser beam; a housing having a window mounted thereon and having a transparent or semi-transparent part formed therein in order to radiate light radiated from an inner portion of the housing to an outer portion thereof, the window transmitting the laser beam radiated from the light source therethough and reflecting the laser beam therefrom and blocking inflow of a visible ray; a lighting device mounted in an inner portion of the housing; a light diffusion member transferring light radiated from the lighting device to the housing; and a printed circuit board including a first printed circuit board having the light source mounted thereon and a second printed circuit board having the lighting device mounted thereon, the first and second printed circuit boards being formed in a stacked structure.

7 Claims, 4 Drawing Sheets

LASER NAVIGATION MODULE

CROSS REFERENCE TO RELATED APPLICATION

This application claims the benefit of Korean Patent Application No. 10-2010-0134691, filed on Dec. 24, 2010, entitled "Laser Navigation Module", which is hereby incorporated by reference in its entirety into this application.

BACKGROUND OF THE INVENTION

1. Technical Field

The present invention relates to a laser navigation module.

2. Description of the Related Art

Generally, a personal mobile communication terminal such as a cellular phone, a smart phone, or the like includes a user interface using a keypad, which includes input buttons for a number, a character, and a direction.

Recently, as a wireless internet service such as a wireless broadband (WIBRO) service has been commercialized, a Windows operating system supporting a graphic user interface (GUI) has also been used in the personal mobile communication terminal.

As the operating system supporting the GUI has been used as a user interface of the personal mobile communication terminal as described above and the demand for development of an input device capable of being conveniently and simply used by users has been urgently increased, apparatuses such as a touch key, a joystick, an optical pointing device, and the like, performing sequential input on a keypad displayed on a display screen of the mobile communication terminal have been developed. One of the apparatuses is a laser navigation module including a window and a lid.

The laser navigation module has a problem in that it does not include a separate lighting device, such that it is difficult for users to use the laser navigation module in a dark location.

More specifically, FIG. 1 is an exploded perspective view schematically showing a laser navigation module, which is an input device for a mobile communication terminal, according to the prior art. As shown in FIG. 1, the laser navigation module 100 is configured to include a window 110, a housing 120, a lid 130, a control integrated circuit (IC) chip 140, a printed circuit board 150, and a dome switch 160.

The window 110 transmits laser beam radiated from a light source therethrough, and blocks inflow of a visible ray. In addition, the window is received in the housing 120.

The lid 130, which is disposed under the window 110, serves as a shielding part for blocking inflow of spill light and includes a circular hole 131 and a rectangular through hole 132. The circular hole 131 is to transmit the laser beam radiated from the light source therethrough, and the rectangular through hole 132 is to transmit laser beam collected by being reflected and refracted on a body, or the like, of a user in contact with the window therethrough.

The control IC chip 140 includes a VCSEL 141, which is a light source of the laser beam, is to calculate a displacement value between the laser beams collected by being reflected and refracted from the window, and is coupled to the printed circuit board 150. The dome switch 160 is coupled to a lower portion of the printed circuit board 150. The dome switch 160 is to sense pressing of the user to transfer a selection signal of the user to a controller (not shown) disposed on a lower portion thereof.

As described above, the laser navigation module according to the prior art does not include a separate lighting device, such that it is inconvenient for users to use the laser navigation module in a dark location, and may have the lighting device mounted in an outer portion of the laser navigation module; however, it is very difficult to mount the lighting device in an inner portion of the housing of the laser navigation module manufactured at a very small size. In addition, the laser navigation module according to the prior art has a technical difficulty in designing such that the lighting device is mounted without interfering with a light path of the VCSEL, which is a light source, and has a problem in which it may not uniformly radiate the light radiated from the lighting device in the inner portion of the housing.

SUMMARY OF THE INVENTION

The present invention has been made in an effort to provide a laser navigation module in which a lighting device is included within a housing of the laser navigation module, a first printed circuit board having a light source mounted thereon and a second printed circuit board having the lighting device mounted thereon are implemented in a stacked structure to improve a degree of freedom of design in a narrow space, and the light source and the lighting device do not interfere with each other, such that an input device and the lighting device may be more efficiently implemented.

According to a first preferred embodiment of the present invention, there is provided a laser navigation module, including: a light source radiating laser beam; a housing having a window mounted thereon and having a transparent or semi-transparent part formed therein in order to radiate light radiated from an inner portion of the housing to an outer portion thereof, the window transmitting the laser beam radiated from the light source therethough and reflecting the laser beam therefrom and blocking inflow of a visible ray; a lighting device mounted in an inner portion of the housing; a light diffusion member transferring light radiated from the lighting device to the housing; and a printed circuit board including a first printed circuit board having the light source mounted thereon and a second printed circuit board having the lighting device mounted thereon, the first and second printed circuit boards being formed in a stacked structure.

The printed circuit board may further include a flexible substrate part connecting the first printed circuit board to the second printed circuit board.

The second printed circuit board may further include a through hole formed therein, the through hole transmitting the laser beam radiated from the light source therethrough.

The first printed circuit board may be a rigid printed circuit board, and the second printed circuit board may be a flexible printed circuit board.

The light diffusion member may have a through hole formed therein and a protrusion formed thereon, the through hole transmitting the laser beam radiated from the light source therethrough, and the protrusion being formed to correspond to the lighting device and changing a direction of the light radiated from the lighting device.

Two lighting devices may be mounted on the second printed circuit board, and the light diffusion member may have a through hole formed therein and two protrusions formed thereon, the through hole transmitting the light radiated from the light source therethrough, and the protrusion being formed to correspond to the lighting device and changing a direction of the light radiated from the lighting device.

The laser navigation module may further include a lid disposed under the window, serving as a shielding part for blocking inflow of spill light and including a circular hole and a rectangular through hole; a control IC chip mounted on the first printed circuit board for calculating a displacement value between laser beams collected by being reflected and refracted from the window; and a dome switch formed on a lower portion of the printed circuit board.

DESCRIPTION OF THE PREFERRED EMBODIMENTS

Figure 1:
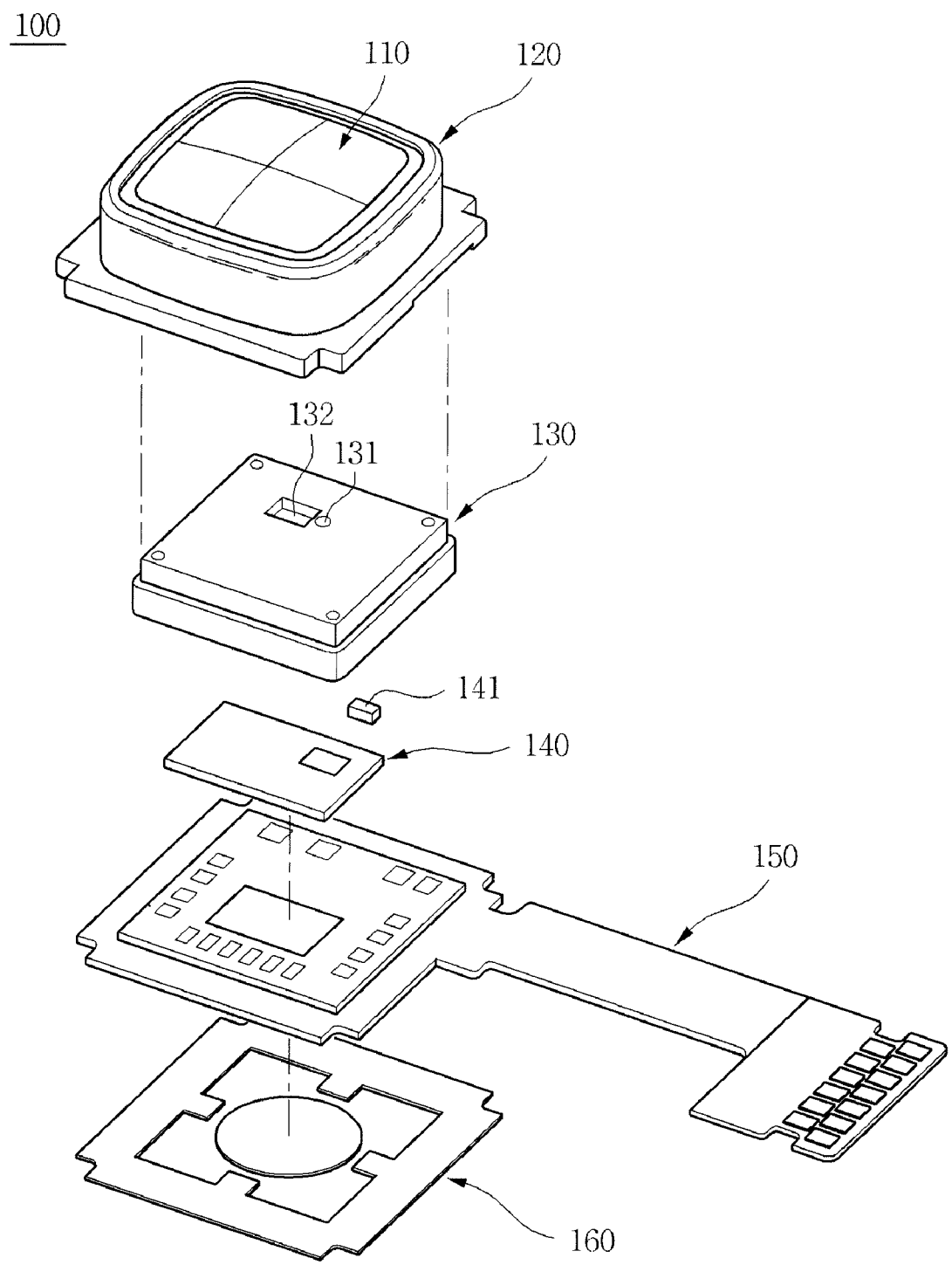
FIG. 1 an exploded perspective view schematically showing a laser navigation module according to the prior art.

Various features and advantages of the present invention will be more obvious from the following description with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. In the description, the terms "first", "second", "one surface", "the other surface" and so on are used to distinguish one element from another element, and the elements are not defined by the above terms. In describing the present invention, a detailed description of related known functions or configurations will be omitted so as not to obscure the gist of the present invention.

Hereinafter, preferred embodiments of the present invention will be described in detail with reference to the accompanying drawings.

Figure 2:
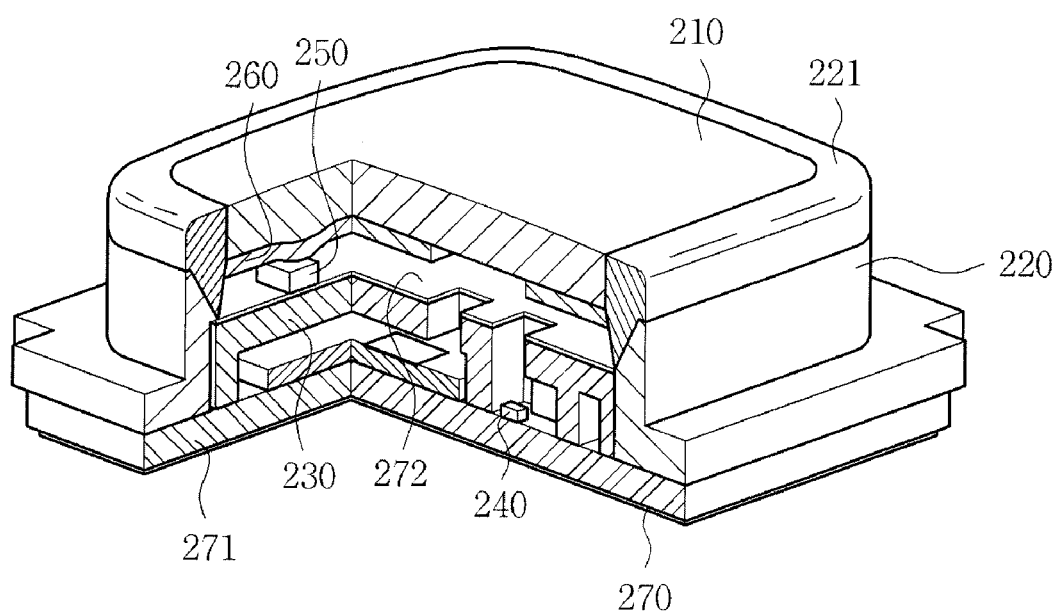
FIG. 2 is a schematic cross-sectional view of a laser navigation module according to a preferred embodiment of the present invention.
Figure 3:
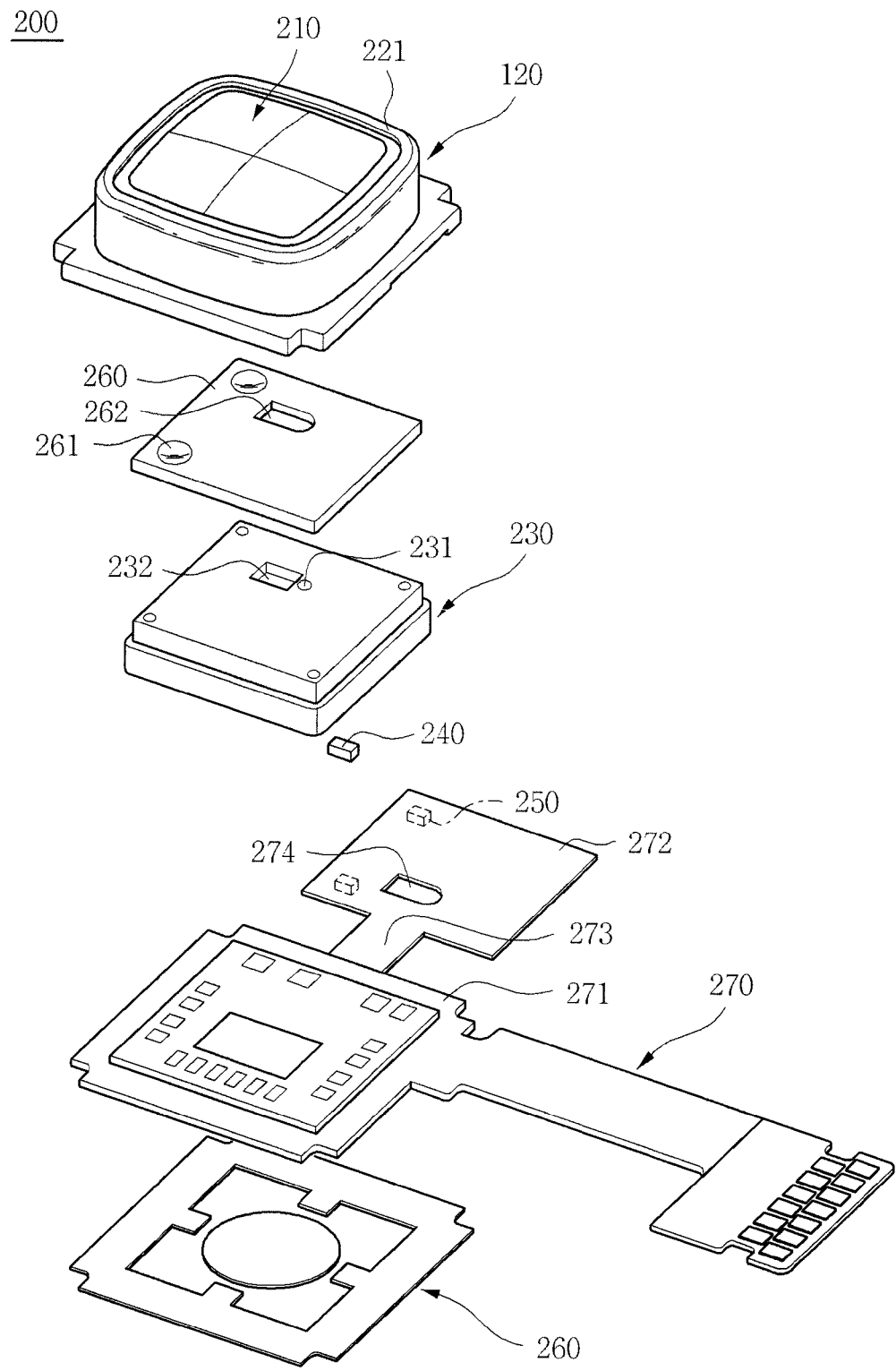
FIG. 3 is a schematic exploded perspective view of the laser navigation module shown in FIG. 2.

FIG. 2 is a schematic cross-sectional view of a laser navigation module according to a preferred embodiment of the present invention, and FIG. 3 is a schematic exploded perspective view of the laser navigation module shown in FIG. 2. As shown in FIGS. 2 and 3, the laser navigation module 200 is configured to include an IR window 210, a housing 220, a lid 230, a VCSEL 240, a control IC chip (not shown), a lighting device 250, a light diffusion member 260, a printed circuit board 270, and a dome switch (not shown).

The laser navigation module according to a preferred example of the present invention has the printed circuit bard 270 stacked on an upper portion of the dome switch (not shown), according to a stacking sequence, and the printed circuit board 270 is configured of a first printed circuit board 271 and a second printed circuit board 272. The control IC chip (not shown) and the VCSEL 240 are mounted on an upper portion of the first printed circuit board 271, the lighting device 250 is mounted on an upper portion of the second printed circuit board 272, and the first and second printed circuit boards are disposed to be stacked.

The lid 230 is coupled to the first printed circuit board so that the lid 230 is disposed on an upper portion of the VCSEL 240. In addition, the second printed circuit board 272 is disposed on an upper portion of the lid 230, the light diffusion member 260 is disposed on the upper portion of the second printed circuit board, and the housing 220 having the IR window 210 mounted thereon is disposed on an upper portion of the light diffusion member 260.

More specifically, the lid 230, which is a shielding part for blocking inflow of spill light, is formed with a circular hole 231 through which laser beam radiated form the VCSEL 240, which is a light source, is transmitted, and a rectangular through hole 232.

The control IC chip calculates a displacement value of laser beam collected by reflecting and refracting the laser beam radiated from the VCSEL from the IR window. In addition, the IR window 210 transmits the laser beam radiated from the VCSEL therethrough and reflects the laser beam therefrom, and blocks inflow of a visible ray.

The lighting device 250, which is to radiate light to an outer portion of the housing, may be preferably implemented by a light emitting diode (LED).

The light diffusion member 260 is formed with a protrusion 261 for changing a progress direction of the light radiated from the lighting device and diffusing the light and a through hole 262 transmitting the laser beam radiated from the VCSEL therethrough. In addition, since the lighting device may not be disposed at the center of the housing in consideration of a position of the VSCEL, or the like, the protrusion is biased to one side to change of the progress direction of the light, and may not be disposed at the center of the light diffusion member 260.

Figure 4:
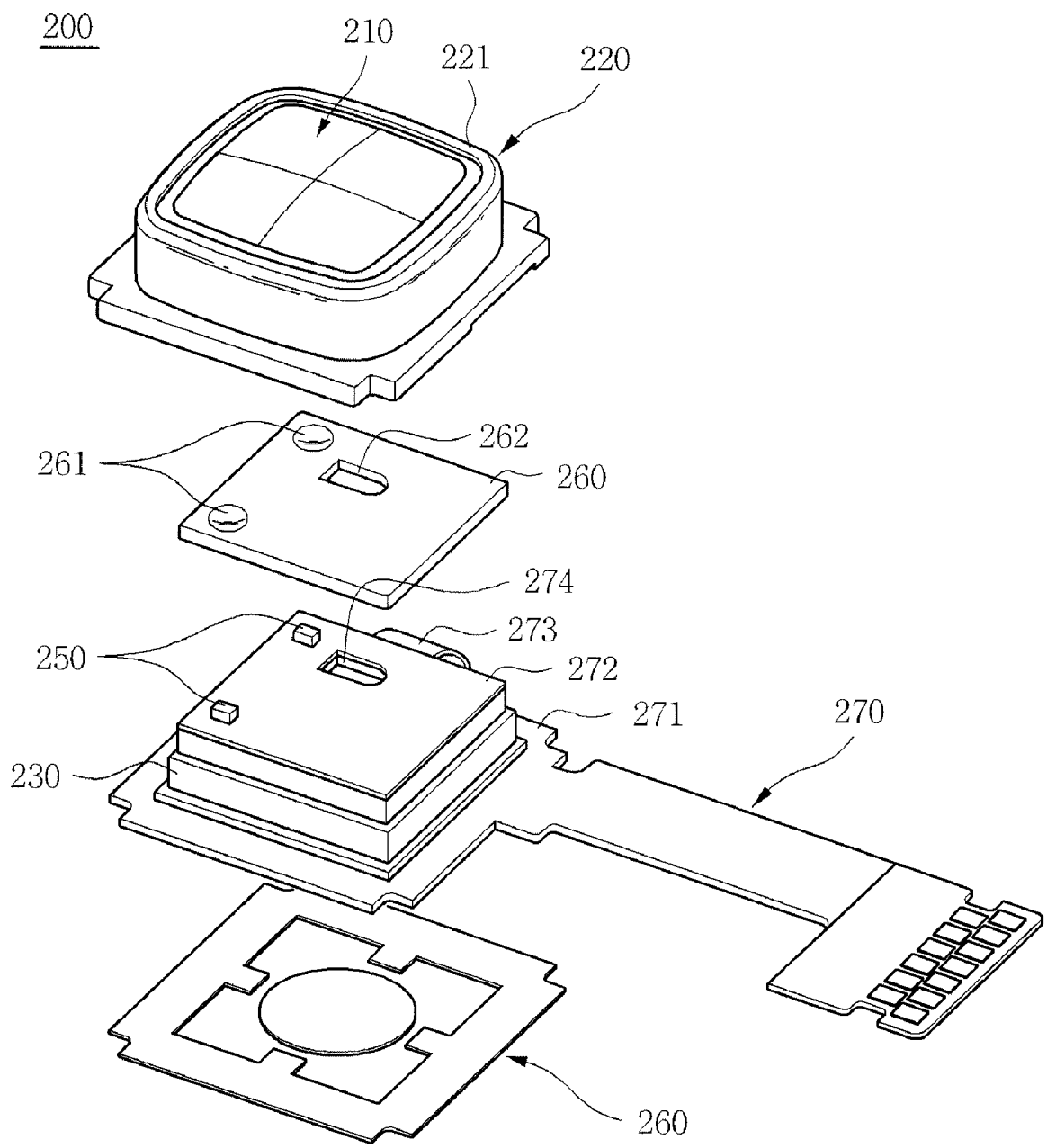
FIG. 4 is a partially exploded perspective view showing a state in which printed circuit boards are coupled to each other in the laser navigation module shown in FIG. 2.

Further, one lighting device 250 or a plurality of lighting devices 250 may be mounted. FIG. 4 shows the light diffusion members in a case in which two lighting devices are mounted. In addition, the lighting device is preferably implemented by the LED.

The housing 220 of the laser navigation module according to a preferred embodiment of the present invention is formed with a transparent or semi-transparent part 221 in order to radiate the light radiated from the lighting device to the outer portion of the housing.

As described above, the printed circuit board 270 is configured of the first printed circuit board 271 and the second printed circuit board 272, and a flexible substrate part 273 connecting the first printed circuit board 271 to the second printed circuit board 272, such that the second printed circuit board 272 may be folded in a folder shape to be disposed on the upper portion of the lead 230, as shown in FIG. 4.

In addition, the first printed circuit board may be a rigid printed circuit board, and the second printed circuit board may be a flexible printed circuit board.

The second printed circuit board 272 is formed with a through hole 274 transmitting the laser beam radiated from the light source therethrough, which is disposed to correspond to the through hole 262 of the light diffusion member 260.

In addition, the lighting device 250 is mounted on an upper portion of the second printed circuit board 272, and is disposed to be opposite to the protrusion 261 of the light diffusion member 260.

FIGS. 3 and 4 show an example in which the laser navigation module according to a preferred embodiment of the present invention includes two LEDs, which are the lighting devices 250, and two protrusions 261 of the light diffusion member 260 formed corresponding to the LEDs 250.

According to the preferred embodiments of the present invention, it is possible to provide the laser navigation module in which the lighting device is included within the housing of the laser navigation module, the first printed circuit board having the light source mounted thereon and the second printed circuit board having the lighting device mounted thereon are implemented in the stacked structure to improve the degree of freedom of design in the narrow space, and the light source and the lighting device do not interfere with each other, such that the input device and the lighting device may be more efficiently implemented.

Although the embodiments of the present invention has been disclosed for illustrative purposes, it will be appreciated that the laser navigation module according to the invention is not limited thereby, and those skilled in the art will appreciate that various modifications, additions and substitutions are possible, without departing from the scope and spirit of the invention.

What is claimed is:

1. A laser navigation module, comprising:
 a light source radiating laser beam;
 a housing having a window mounted thereon and having a transparent or semi-transparent part formed therein in order to radiate light radiated from an inner portion of the housing to an outer portion thereof, the window transmitting the laser beam radiated from the light source therethough and reflecting the laser beam therefrom and blocking inflow of a visible ray;
 to a lighting device mounted in an inner portion of the housing;
 a light diffusion member transferring light radiated from the lighting device to the housing; and
 a printed circuit board including a first printed circuit board having the light source mounted thereon and a second printed circuit board having the lighting device mounted thereon, the first and second printed circuit boards being formed in a stacked structure.

2. The laser navigation module as set forth in claim 1, wherein the printed circuit board further includes a flexible substrate part connecting the first printed circuit board to the second printed circuit board.

3. The laser navigation module as set forth in claim 1, wherein the second printed circuit board further includes a through hole formed therein, the through hole transmitting the laser beam radiated from the light source therethrough.

4. The laser navigation module as set forth in claim 1, wherein the first printed circuit board is a rigid printed circuit board, and the second printed circuit board is a flexible printed circuit board.

5. The laser navigation module as set forth in claim 1, wherein the light diffusion member has a through hole formed therein and a protrusion formed thereon, the through hole transmitting the laser beam radiated from the light source therethrough, and the protrusion being formed to correspond to the lighting device and changing a direction of the light radiated from the lighting device.

6. The laser navigation module as set forth in claim 1, wherein two lighting devices are mounted on the second printed circuit board, and the light diffusion member has a through hole formed therein and two protrusions formed thereon, the through hole transmitting the light radiated from the light source therethrough, and the protrusion being formed to correspond to the lighting device and changing a direction of the light radiated from the lighting device.

7. The laser navigation module as set forth in claim 1, further comprising:
 a lid disposed under the window, serving as a shielding part for blocking inflow of spill light, and including a circular hole and a rectangular through hole;
 a control IC chip mounted on the first printed circuit board for calculating a displacement value between laser beams collected by being reflected and refracted from the window; and
 a dome switch formed on a lower portion of the printed circuit board.

* * * * *